US010796197B2

(12) United States Patent
Chaplahin

(10) Patent No.: US 10,796,197 B2
(45) Date of Patent: Oct. 6, 2020

(54) AUTOMATIC METHOD AND SYSTEM FOR SIMILAR IMAGES AND IMAGE FRAGMENTS DETECTION BASING ON IMAGE CONTENT

(71) Applicant: Mykola Petrovych Chaplahin, Lviv (UA)

(72) Inventor: Mykola Petrovych Chaplahin, Lviv (UA)

( * ) Notice: Subject to any disclaimer, the term of this patent is extended or adjusted under 35 U.S.C. 154(b) by 70 days.

(21) Appl. No.: 16/325,921

(22) PCT Filed: Nov. 3, 2016

(86) PCT No.: PCT/UA2016/000126
§ 371 (c)(1),
(2) Date: Feb. 15, 2019

(87) PCT Pub. No.: WO2018/034634
PCT Pub. Date: Feb. 22, 2018

(65) Prior Publication Data
US 2019/0197351 A1 Jun. 27, 2019

(30) Foreign Application Priority Data
Aug. 16, 2016 (UA) .................... 2016 08858

(51) Int. Cl.
*G06T 7/60* (2017.01)
*G06K 9/62* (2006.01)
(Continued)

(52) U.S. Cl.
CPC ....... *G06K 9/6215* (2013.01); *G06F 16/2452* (2019.01); *G06T 7/136* (2017.01); *G06T 7/60* (2013.01); *G06K 2009/6213* (2013.01)

(58) Field of Classification Search
CPC .......... G06K 9/6215; G06K 2009/6213; G06F 16/2452; G06T 7/136; G06T 7/60
See application file for complete search history.

(56) References Cited

U.S. PATENT DOCUMENTS 6,941,323 B1 * 9/2005 Galperin ............... G06F 19/321
7,043,094 B2 * 5/2006 Thomas ................. G06K 9/342
382/305

(Continued)

FOREIGN PATENT DOCUMENTS

WO WO 01/11489 2/2001

OTHER PUBLICATIONS

Kim, Hae-Kwang et al., "Region-based shape descriptor invariant to rotation, scale and translation", Signal Processing, Image Communication, Elsevier Science Publishers, Amsterdam, NL, vol. 16, No. 1-2, Sep. 1, 2000, pp. 87-93.
(Continued)

*Primary Examiner* — Marcus Hammonds
(74) *Attorney, Agent, or Firm* — Warner Norcross + Judd LLP

(57) ABSTRACT

A proposed invention relates to the field of information technologies and can be used in information technologies, which relates to computer vision, for comparison and search of similar images and their fragments by the content in large databases/pictures banks. The claimed method for completely automatic detection of similar images and images fragments in large data storages or data banks comprising image content processing, stages of construction to represent numerical vector image content. Each image is processed in the data store to determine the content that is treated as geometric shapes, and numerical vector representing the image built based on the geometric parameters of defined geometric shapes. A numeric vector which consists of geometric parameters of image figures, measured at original size of geometric shape, and after normalization, is the vector that defines the image with accuracy and uniqueness, and which allows comparison and detection of similar images.

2 Claims, 15 Drawing Sheets

(51) Int. Cl.
*G06F 16/2452* (2019.01)
*G06T 7/136* (2017.01)

(56) References Cited

U.S. PATENT DOCUMENTS 7,228,006 B2 * 6/2007 Stubler ................ G06K 9/6211
382/286
8,447,107 B1 * 5/2013 Dhua ................... G06K 9/4604
382/170
8,463,036 B1 * 6/2013 Ramesh ............... G06K 9/4642
382/170
10,176,198 B1 * 1/2019 Dhua ................ G06F 17/30247

OTHER PUBLICATIONS

The International Search Report and Written Opinion of the International Search Authority for International Application No. PCT/UA2016/00126 dated Apr. 21, 2017.

* cited by examiner

| Image, geometric shape/segment | | | | | |
|---|---|---|---|---|---|
| Image title, parametrs S, L, S/L | Lena.jpg "Lena" original | S=1654 L=1596 S/L=1.04 | S=2755 L=1200 S/L=2.3 | S=4320 L=2287 S/L=1.89 | S=3397 L=2627 S/L=1.29 |
| Geometric shape/segment | | | | | |
| Parametrs S, L, S/L | S=4179 L=2930 S/L=1.43 | S=4451 L=2828 S/L=1.57 | S=4936 L=3048 S/L=1.62 | S=4967 L=3062 S/L=1.62 | S=4355 L=2479 S/L=1.76 |
| Geometric shape/segment | | | | | |
| Parametrs S, L, S/L | S=2058 L=1424 S/L=1.45 | S=1599 L=1031 S/L=1.55 | S=1175 L=623 S/L=1.89 | S=154 L=70 S/L=2.2 | S=0 L=0 S/L=0 |
| Geometric shape/segment | | | | | |
| Parametrs S, L, S/L | S=0 L=0 S/L=0 | S=0 L=0 S/L=0 | | | |

Fig. 9

| Image, geometric shape/segment | 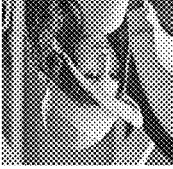 | 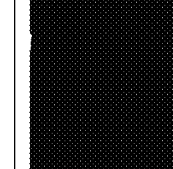 |  |  |  |
|---|---|---|---|---|---|
| Image title, parametrs S, L, S/L | Lena_mr180.jpg "Lena" mirrored and 180 degrees rotated | S=1671<br>L=1601<br>S/L=1.04 | S=3105<br>L=1345<br>S/L=2.31 | S=4014<br>L=2310<br>S/L=1.74 | S=3362<br>L=2591<br>S/L=1.3 |
| Geometric shape/segment |  |  |  |  |  |
| Parametrs S, L, S/L | S=4149<br>L=2921<br>S/L=1.42 | S=4554<br>L=2844<br>S/L=1.6 | S=5010<br>L=3064<br>S/L=1.64 | S=4895<br>L=3020<br>S/L=1.62 | S=4341<br>L=2439<br>S/L=1.78 |
| Geometric shape/segment |  | 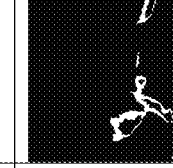 | 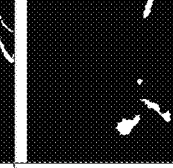 | 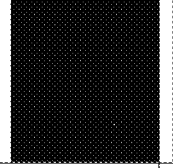 | 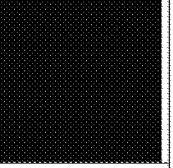 |
| Parametrs S, L, S/L | S=1994<br>L=1419<br>S/L=1.41 | S=1636<br>L=1024<br>S/L=1.6 | S=1139<br>L=579<br>S/L=1.97 | S=130<br>L=61<br>S/L=2.13 | S=0<br>L=0<br>S/L=0 |
| Geometric shape/segment | 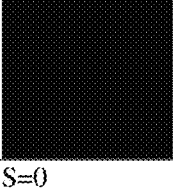 | 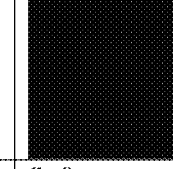 | | | |
| Parametrs S, L, S/L | S=0<br>L=0<br>S/L=0 | S=0<br>L=0<br>S/L=0 | | | |

Fig. 10

| Image, geometric shape/segment |  | 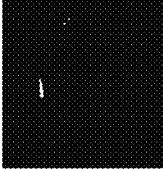 |  | 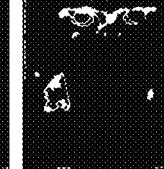 | 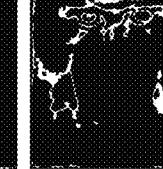 |
|---|---|---|---|---|---|
| Image title, parametrs S, L, S/L | mandrill.jpg | S=1652<br>L=1638<br>S/L=1.01 | S=768<br>L=454<br>S/L=1.69 | S=1781<br>L=1217<br>S/L=1.46 | S=2891<br>L=2152<br>S/L=1.34 |
| Geometric shape/segment |  |  |  |  |  |
| Parametrs S, L, S/L | S=5122<br>L=3076<br>S/L=1.67 | S=8660<br>L=4146<br>S/L=2.09 | S=6332<br>L=4142<br>S/L=1.53 | S=5289<br>L=3340<br>S/L=1.58 | S=3849<br>L=2214<br>S/L=1.74 |
| Geometric shape/segment |  | 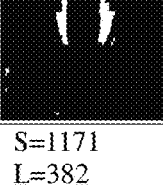 | 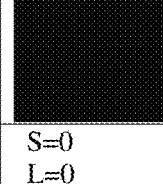 | 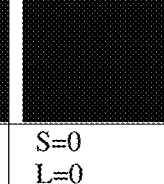 | 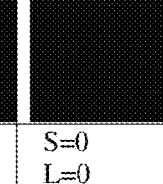 |
| Parametrs S, L, S/L | S=2482<br>L=1222<br>S/L=2.03 | S=1171<br>L=382<br>S/L=3.07 | S=0<br>L=0<br>S/L=0 | S=0<br>L=0<br>S/L=0 | S=0<br>L=0<br>S/L=0 |
| Geometric shape/segment | 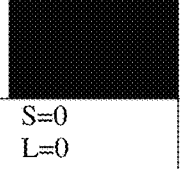 | 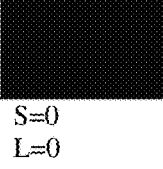 | | | |
| Parametrs S, L, S/L | S=0<br>L=0<br>S/L=0 | S=0<br>L=0<br>S/L=0 | | | |

Fig. 11

| Image, geometric shape/segment |  | 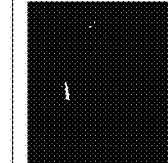 | 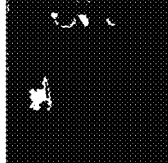 | 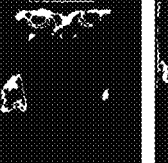 | 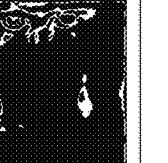 |
|---|---|---|---|---|---|
| Image title, parametrs S, L, S/L | baboon.jpg | S=1652<br>L=1638<br>S/L=1.01 | S=768<br>L=454<br>S/L=1.69 | S=1781<br>L=1217<br>S/L=1.46 | S=2891<br>L=2152<br>S/L=1.34 |
| Geometric shape/segment |  |  |  | 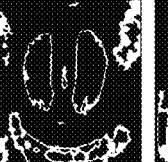 |  |
| Parametrs S, L, S/L | S=5122<br>L=3076<br>S/L=1.67 | S=8660<br>L=4146<br>S/L=2.09 | S=6332<br>L=4142<br>S/L=1.53 | S=5289<br>L=3340<br>S/L=1.58 | S=3849<br>L=2214<br>S/L=1.74 |
| Geometric shape/segment |  |  | | | |
| Parametrs S, L, S/L | S=2482<br>L=1222<br>S/L=2.03 | S=1171<br>L=382<br>S/L=3.07 | S=0<br>L=0<br>S/L=0 | S=0<br>L=0<br>S/L=0 | S=0<br>L=0<br>S/L=0 |
| Geometric shape/segment | 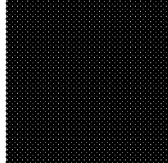 | 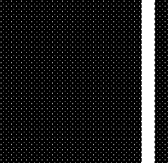 | | | |
| Parametrs S, L, S/L | S=0<br>L=0<br>S/L=0 | S=0<br>L=0<br>S/L=0 | | | |

Fig. 12

| Image, geometric shape/segment | | | | | |
|---|---|---|---|---|---|
| Image title, parametrs S, L, S/L | pepers-flip-small.jpg | S=4183 L=2519 S/L=1.66 | S=2646 L=1742 S/L=1.52 | S=2590 L=1856 S/L=1.4 | S=3615 L=2146 S/L=1.68 |
| Geometric shape/segment | | | | | |
| Parametrs S, L, S/L | S=5249 L=2668 S/L=1.97 | S=2945 L=2310 S/L=1.27 | S=2686 L=2189 S/L=1.23 | S=2929 L=2447 S/L=1.2 | S=4247 L=2810 S/L=1.51 |
| Geometric shape/segment | | | | | |
| Parametrs S, L, S/L | S=3462 L=2473 S/L=1.4 | S=3928 L=2028 S/L=1.94 | S=1331 L=765 S/L=1.74 | S=189 L=105 S/L=1.8 | S=0 L=0 S/L=0 |
| Geometric shape/segment | | | | | |
| Parametrs S, L, S/L | S=0 L=0 S/L=0 | S=0 L=0 S/L=0 | | | |

Fig. 13

AUTOMATIC METHOD AND SYSTEM FOR SIMILAR IMAGES AND IMAGE FRAGMENTS DETECTION BASING ON IMAGE CONTENT

A proposed invention relates to the field of information technologies and can be used in information technologies, which relates to the computer vision, for comparison and search of similar images and their fragments by the content in large databases/pictures banks.

Development of the digital devices for images and movies making, programs for images processing and modification and services for digital images storage and representation caused huge increment in digital images availability in databanks and databases.

Users and administrators losing control on digital images appearance and order, that causes huge storage and transmit resources over usage for duplicate and similar images processing and storing.

In U.S. Pat. No. 8,004,576 B2 patent (IPC H041V 5/228, G06K 9/22, published Aug. 23, 2011) disclosed technology for object recognition, which used in cell phones, and in which multidimensional histogram is used to highlight and compare images. The disadvantage of said method is the necessity to use the histogram for computing in general, which increases the amount of required calculations and the complexity of computing, because it is necessary to consider a potential small histogram shifts in all dimensions. Also, the histogram does not provide idea about image content, and is based on the number of points of a certain colour or brightness, which increases the probability of incorrect similarity identifications.

In U.S. Pat. No. 6,687,402 B1 patent (IPC G06K 9/48, published Feb. 3, 2004) disclosed machine vision method and system for comparing a pattern to an image. The method is based on image outline determination and comparison of each point of outlines of two images for determination of mutual relationship. The known method has low accuracy comparison.

The prior art discloses system and method for near-duplicate image detection performed by a physical computing system (US 20120076423 A1 application, IPC G06K 9/46, published Mar. 29, 2012). In the method geometric features are used to reduce computation during similar images search. Said method does not provide a high accuracy comparison and requires complex computations.

Image search method is described in US 20090290798 A1 application (IPC G06K 9/46, published Nov. 26, 2009) in which for images search, an image is segmented on special regions (affinity-independent regions, according to the description), the regions are normalized to affinity-independent type, the regions of comparable regions are deformed, and search is made by means of comparison of basic received regions with deformed comparable regions. Said method has calculation complexity, and also during its implementation the necessity of recomputation, when changing the comparable base, is not eliminated.

In U.S. Pat. No. 8,472,757 B2 patent (IPC G06K 9/54, published Jun. 25, 2013) disclosed image search method for determination of a similarity between an input image and a registered image, in which for images search is used features pairs determination (on the input image and on the comparative image), and coordinates curvature is determined for all pairs of features. In this method is present dependence of processing of the input image from the comparative image, which requires to carry out calculations many times, which significantly increases the number of required calculations.

The task of the present invention is a development of automatic method for similar images and image fragments detection basing on image content in large databases or data banks, in which through the proposed action sequence is achieved the minimization of operations with images and the usage of a minimal amount of computations. It means that each image is processed only once, and the comparison process does not depend on other images, image processing results are subjected to automatic storage and compared to the original, without any complex computations.

The task is solved by the fact that the proposed automatic method for similar images and image fragments detection basing on image content, characterized in that through a computer system, which control unit contains additional interconnected modules:

module for input configuration, to setup database and input image;
module for image segmentation;
module for segments processing;
module for numeric vector development;
module for numeric vector storage;
user module for data representation, are carried out the following stages:

a) specifying at least one input image;
b) specifying options of the input image processing;
c) carrying out the input image processing, according to the options, selected at stage b);
d) choosing through the segmentation, at least one geometric shape;
e) normalizing indicated geometric shapes and identifying areas ratio to the length of the outline Sn/Ln of the normalized geometric shape for creation of the numerical vector Ven, and, if necessary, additional geometric parameters;
f) creating numeric vector Ven, which includes geometric parameters calculated at stage e), for each geometric shape selected at stage d), wherein the numeric vector Ven expressed by the following formula:

$$Ven=[Sn1/Ln\ Sn2/Ln\ Sn3/Ln3\ \ldots\ Snk/Lnk],$$

where k—a number of geometrical shapes (segments) allocated on the image;

g) saving numeric vector built at stage f) in data storage and in module for numeric vector storage of the control unit;
h) calculating the difference dV between the numerical vector Ven, built at stage f), and image numerical vector Vdb previously saved in a data storage for all comparative images;
i) identifying images as similar images, if the dV difference less than the specified boundary value.

In one embodiment of the present invention at stage e) said geometric shapes are processed and area ratio to the outline length of geometric shape S/L is calculated for creation of the numeric vector Ven of the input image and, if necessary, additional geometric parameters.

Furthermore, additional geometric parameters, which calculated at stage e), are: shortest projection Psn and longest projection Pln of normalized geometric shape, and a number of outline angles An of the geometric shape.

Moreover, additional geometric parameters, which calculated at stage e), are: shortest projection Ps and longest projection Pl of the geometric shape, and a number of outline angles A of the geometric shape.

The advantage of the proposed method is that it based on the usage of affinity-independent parameters of image content to build numerical vector that represents the image content and can be saved and transformed. Moreover, numerical vector is used for comparison, excluding the impact and interdependence of images processing from each other. The method provides the minimization of operations with images, and usage of the smallest amount of computations. It means that each image should be processed only once, and the comparison process should not depend on other images, image processing results should be stored and compared in original without any complex computations.

The method can be entirely automated due to the complete formalization and excludes the human factor intervention at any image comparison stage, apart from result evaluation.

The invention is described by graphic material, where FIG. 1 shows a highlighted (segmented) front rectangles, FIG. 2 shows a highlighted (segmented) background rectangle, FIG. 3 shows a highlighted (segmented) background of image, FIG. 4 shows a highlighted (segmented) front rectangles after one was rotated and shifted, FIG. 5 shows a highlighted (segmented) background rectangle (from image with front rotated rectangles), FIG. 6 shows a highlighted (segmented) front rectangles after one was rotated and shifted, FIG. 7 shows a highlighted (segmented) background rectangle (from image with front rotated rectangles), FIG. 8 shows a highlighted (segmented) background on image, FIG. 9 shows a table with an example of the method on a standard image "Lena", FIG. 10 shows a table with an example of the method on a transformed image "Lena_mr180", FIG. 11 shows a table with an example of the method on a standard image Mandrill, FIG. 12 shows a table with an example of the method on image Baboon, FIG. 13 shows a table with an example of the method on image Pepper, FIG. 14 and FIG. 15 shows a flowchart of the proposed method.

The mathematical explanation of the invention.

The proposed method is based on the geometric properties of geometric figures. For method essence understanding, the known formulas for outline area and length determination should be considered.

For a rectangle with sides a and b:

$$\text{area } Sr = a*b; \quad (1)$$

$$\text{outline length } Lr = 2*a + 2*b. \quad (2)$$

For a circle with radius r:

$$\text{area } Sc = \pi * r^2; \quad (3)$$

$$\text{outline length } Lc = 2*\pi*r. \quad (4)$$

Assuming that outline length is constant, and rectangle outline length and circle outline length are equal Lr=Lc, then r can be expressed through a and b:

$$2*a + 2*b = 2 \pi*r;$$

$$a+b = \pi*r;$$

$$r = (a+b)/\pi. \quad (5)$$

Substituting expression in the area formula, we get:

$$Sc = \pi*((a+b)/\pi)^2 = (a+b)^2/\pi.$$

Thus, imagining that figures length is equal (Lc=Lr), we can see that their areas are coincide only in case of unique combination of rectangle sides length. And, in most cases, the area figures will be different.

The implication is that ratio of the figure area to the length of its outline precisely enough describes the figure and distinguishes it from others. Thus, area and outline length parameters are sufficient for determining similarity of figures.

Additional geometric parameters of figures, such as longer and shorter projection on the axis coordinates (unlike circle, rectangular has different parameters) and the number of corners circuit (4 vs 0) can be used to increase the accuracy of the figures similarity determination.

Because each image is composed of several objects, and each object has the above mentioned characteristics, then the increase in the number of objects can be reduced to the number of parameters for determination of each of them, as parameters will complement each other.

IMAGES DESCRIPTION

FIG. 1. Segmented (using colour difference) front rectangles. They are used to demonstrate similarity and not similarity of the images. It can be described in human words like: "Two same coloured rectangles inside bigger rectangle on rectangle background". Two rectangles are treated as single geometric shape.

FIG. 2. Segmented (using colour difference) background rectangle.

FIG. 3. Segmented (using colour difference) background of image.

FIG. 4. Segmented (using colour difference) front rectangles after one was rotated and shifted. They still have same area value, outline value. Value of longest projection to axis is changed (it much less due to shift). Number of angles is the same. But they still can be described as: "Two same coloured rectangles inside bigger rectangle on rectangle background".

FIG. 5. Segmented (using colour difference) background rectangle. It is the same. So, basing on Images FIG. 1+FIG. 2 and FIG. 4+FIG. 5, original pictures with those segments can be found similar. And, actually, from semantic point of view it is correct. But in case emplacement is important—longest projection parameter makes images not similar.

FIG. 6. Segmented (using colour difference) front rectangles after one was rotated and shifted. They still have same area value, outline value. Value of longest and shortest projection to axis is changed due to shift. Number of angles is the same. But they can not be described as previously "Two same coloured rectangles inside bigger rectangle on rectangle background" because one of them, left one, is partially outside the background rectangle that is displays on next image.

FIG. 7. Segmented (using colour difference) background rectangle. It displays that one of front rectangles is out of background rectangle, so image is definitely not similar to previous two. Also, we can see, that shape has changed, so area has changed, outline length has changed and number of angles has changed.

FIG. 8. Segmented (using colour difference) background on image that has modified values for area, outline length and number of angles. So image that represented by those segments can not be found similar to previous two.

FIG. 9 shows a table with an example of the method on a standard image "Lena".

FIG. 10 shows a table with an example of the method on a transformed image "Lena_mr180".

FIG. 11 shows a table with an example of the method on a standard image Mandrill.

FIG. 12 shows a table with an example of the method on image Baboon.

FIG. 13 shows a table with an example of the method on image Pepper.

Image-representing simple non regular geometric shapes (hereinafter referred to as geometric shapes) that are numerically representable, compatible and storable are used in described method. Those shapes are automatically extractable and characterize image content with acceptable preciseness. Also, those shapes unrelated to emplacement and affine transformation of the actual objects on image.

In present method each image is processed independently from others to reduce calculations. Method is independent from relations between query image and compared image.

In the context of the present invention, by an input image or image input set is meant an images that will be checked in the data storage (database) to determine the presence or absence of similar ones. A comparative image is an images that previously stored in a database or data storage. Similar images are images that in result of operation of the proposed method by using the geometric parameters of the original and normalized geometric shape have been identified as having a similar copy in a data storage.

Geometric shape is extracted from image basing on any segmentation algorithm. There are big variety of segmentation methods and algorithms, any of them can be used. Methods of segmentation are not the goal of this description, any of them can be selected for image types in database or databank.

Given method is based on usage of geometric parameters of geometric shape, which represents the image, that are, but not limited to: area S of the geometric shape, outline length L of the geometric shape, shortest projection Ps and longest projection Pl of the geometric shape to any coordinate axis, and a number of outline angles A of the geometric shape, and also theirs ratio.

Figure 1:
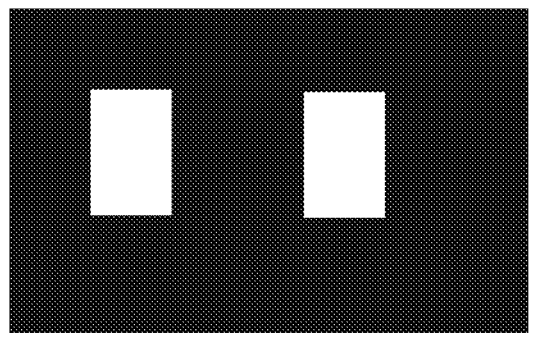
Figure 2:
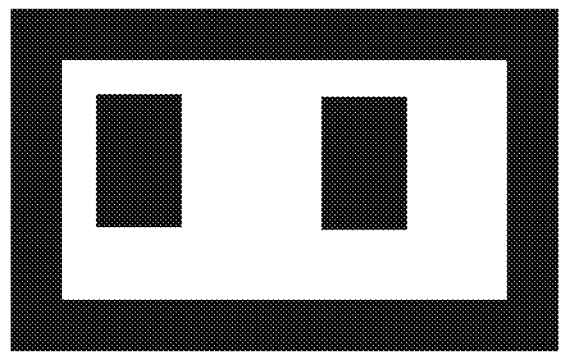
Figure 3:
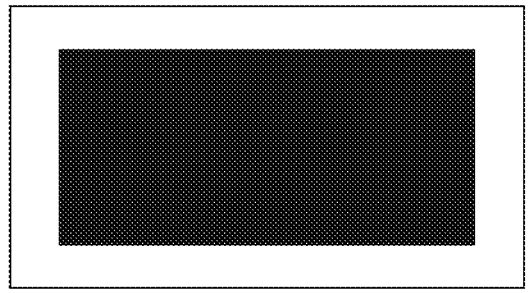
Figure 4:
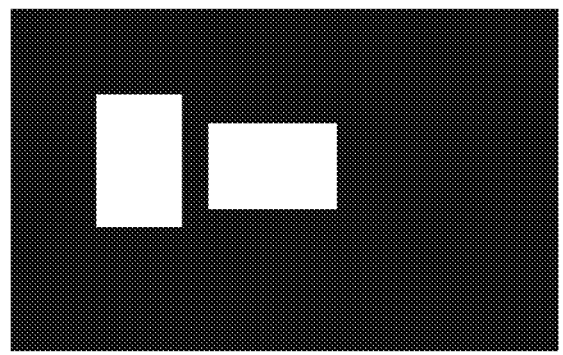
Figure 5:
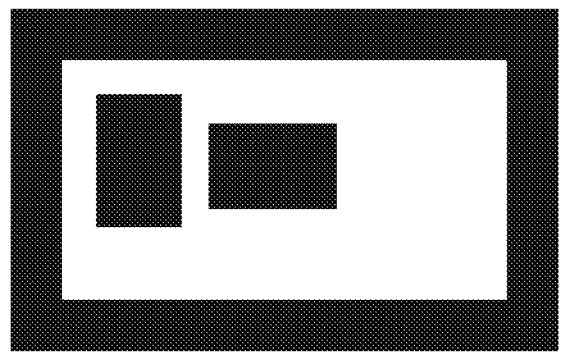
Figure 6:
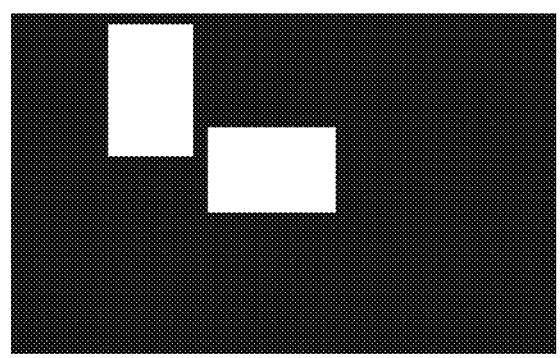
Figure 7:
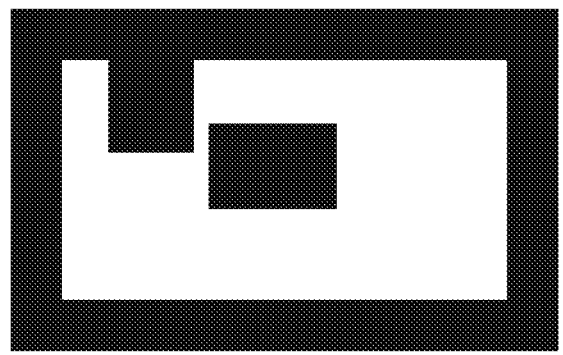
Figure 8:
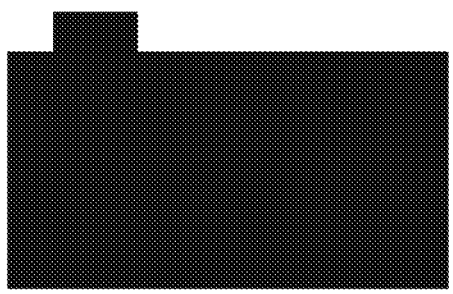

Each geometric shape as results of any segmentation algorithm is treated as single geometric shape that contains all possible geometric parameters. There is no requirement for shape to be continuous (see FIG. 1.). It means that several regions of the geometric shape that has no contiguous pixels are treated as single geometric shape with appropriate parameters. So area of geometric shape includes all dots, pixels or any other units of selected segment; contour is equal to area outline or sum of outlines of all segment parts if they have no common pixels; and so on.

Relations between parameters are used to minimize calculations in images match system. For example, value equal to result of division of segment's area S to segment's contour length L for each geometric shape on the image provides enough preciseness for overall images matching system. Other geometric parameters in the numeric vector increase matching preciseness. Parameters also can be corrected, for example, to value equal to relation between area of geometric shape to general image area. A numeric vector which consists of geometric parameters of image figures, measured at original size of geometric shape, and after normalization, is the vector that defines the image with accuracy and uniqueness, and which allow to carry out comparison and to detect images similarity.

As used herein, the following designations are used as numeric vectors:

Ven—a numeric vector for input image;

Vdb—a numeric vector for previously saved image in data storage/database (a numeric vector is separately computed for each image).

Additional geometric parameters in numeric vector are added to eliminate possible values ambiguity. The parameters for the formation of a numeric vector Ven are: area S ratio of the geometric shape to the outline length L of the geometric shape; additional—area S of the geometric shape, the outline length L of the geometric shape, shorter projection Ps and longer projection Pl of the geometric shape and a number of outline angles A of the geometric shape and ratio between them of the normalized geometric form, where normalization means incorporating of the geometric shape in predefined geometric shape such as a circle of pre-defined length of the radius, or a square with pre-defined side length. Such parameters are area Sn of normalized geometric shape, outline length Ln of normalized geometric shape, shortest projection Psn and longest projection Pln of normalized geometric shape, if necessary.

In the context of the claimed invention, the computer system consists of a desktop computer, a laptop, a smartphone, a personal digital assistant (PDA), or any other device which is connected to the input and output informational means, wired or wireless connection. The computer includes a processor that works as a control unit, which works in conjunction with memory for operations, as defined by the installed program. The program can be pre-stored in a computer located storage device and ROM (permanent memory device) that serves as recording media data. Alternatively, the program may be stored (recorded) on a removable media. The input query image and comparable images can be entered directly into the computer system (for example, a digital camera) or digitized form, for example by scanning.

As data storage (database) of image can be any relational database or any other type of database that stores data which are used for operation of the method described herein; storage saves various images (according to the method), numeric vectors and the data obtained in the image comparison, and therefore is a means used in the proposed technical solution. Moreover, the method is used at least one data storage (database).

The control unit of the computer system contains additional interconnected modules:

module for input configuration, to setup database and input image;

module for image segmentation;

module for segments processing;

module for numeric vector development;

module for numeric vector storage;

and user module for data representation.

Module for input configuration, to specify database and input image is module for interactions with users—user specifies database where results of the system work will be stored, and which will be used for images matching. Also user defines input image or set of images, that must be processed and processing parameters, if system allows user to specify those. Also, here can be defined parameters for image segmentation.

Module for image segmentation is used for segments detection on image, basing on parameters, defined in previous module. Segment will be treated as geometric shape and it's parameters are transferred to next module. Also, module for segments processing is used for computation of geometric shapes, set geometric parameters are computed in it, such as, but not limited to: area, outline length, shortest projection to axis, longest projection to axis and other. Geometric parameters of the normalized geometric shape can be computed in this module as well.

Module for numeric vector development is used for numeric vector development using results of all images segments processing.

Module for numeric vector storage is used to store numeric vectore instorage following defined rules. In this module also new numeric vector is being compared to previously stored to detect vector with minimum distance. In case this distance is less then predefined boundary value—images, that are represented by those vectors are treated as similar.

User module for data representation displays groups of similar images in user-friendly form. User can decide what to do with similar images, basing on the goal of images similarity detection process.

The method is explained by the following examples.

EXAMPLE 1

Figure 14:
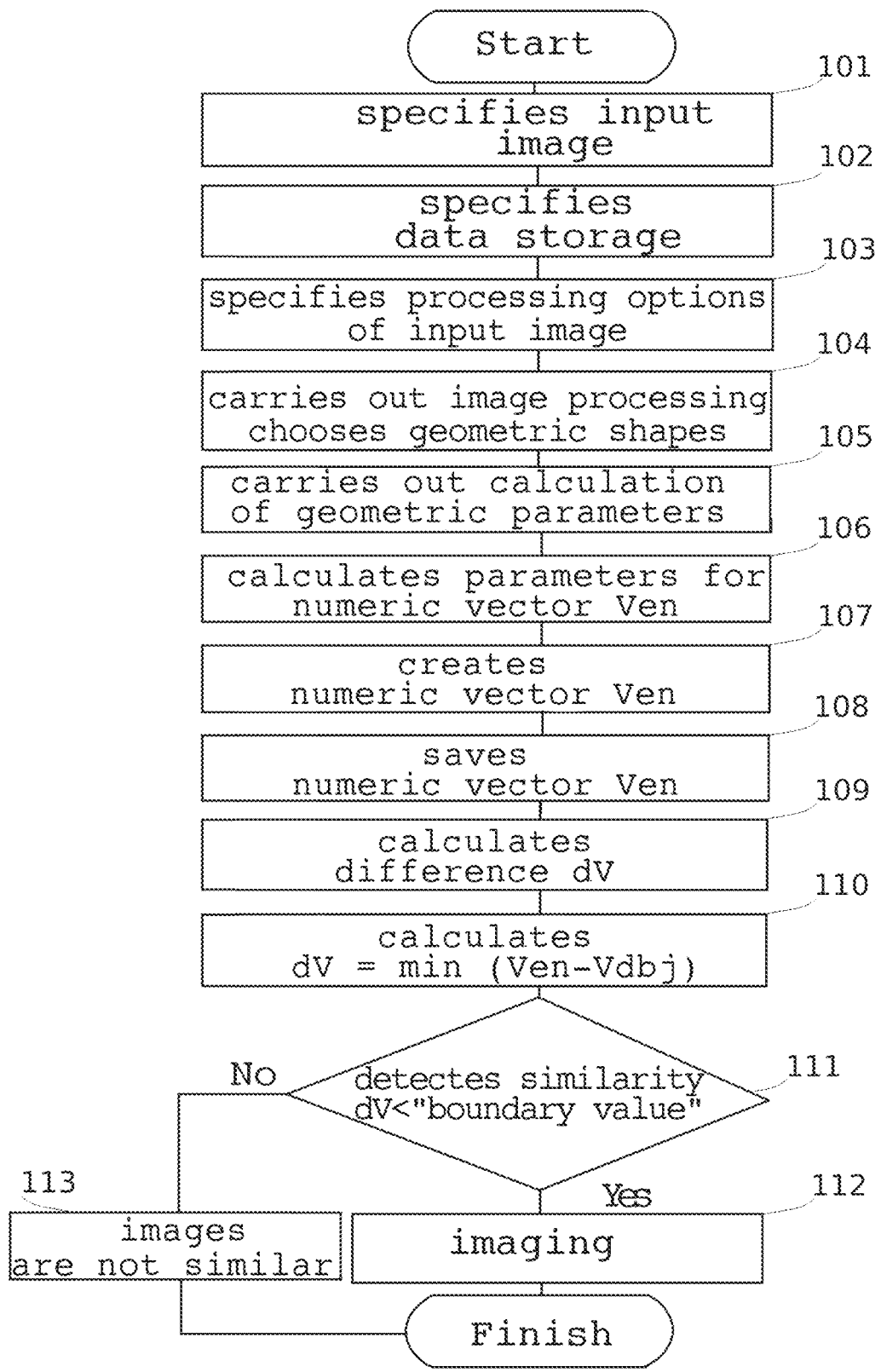
FIG. 14 shows a flowchart of the proposed method.

As Shown in FIG. 14

A user indicates (step 101) an input image concerning which to determine whether there is already similar image in a data storage.

The user indicates (step 102) data storage (database), where an input image is stored, and is used to compare to the processed images.

The user sets the parameters of the input image processing, segmentation options and limit value "boundary value" (step 103).

Stages 101-103 are carried out using the module for maintenance, configuration database options and input image.

Module with means for image segmentation where carried out image processing (step 104) and separate geometric shapes. Then (step 105) geometric parameters computed of the allotted geometric shapes is carried out. Thereafter, geometric shapes are processed and computed (step 106) parameters for numeric vector Ven, such as area ratio to the outline length S/L, and, if necessary, area S, outline length L, shortest projection Ps and longest projection Pl on the X and Y axis, and a number of outline angles A of the geometric shape.

Module with means for the development of numerical vector build (step 107) a numeric vector for all selected geometric shapes (image segments). The vector includes sufficient parameters for input image comparing with images in a given data storage.

The numeric vector comprising, for example, only the area ratio to the outline length of the path, expressed as follows:

$$Ven=[S1/L1\ S2/L2\ S3/L3\ \ldots\ Sk/Lk],$$

or the numeric vector comprising all the possible options:

$$Ven=[S1/L1\ S1\ L1\ Ps1\ Pl1\ A1\ S2/L2\ S2\ L2\ Ps2\ Pl2\\ A2\ S3/L3\ S3\ L3\ Ps3\ Pl3\ A3\ \ldots\ Sk/Lk\ Sk\ Lk\\ Psk\ Plk\ Ak],$$

where k—a number of geometrical shapes (segments) allocated on the image and the value S, L, Ps, Pl, A for each geometric shape (segment) can be added to improve the accuracy of comparison.

Module with means for numeric vector storage retain (step 108) a numeric vector Ven as an array of numeric values in this module. Then (step 109) difference dV is computed between the numerical vector Ven, built at stage 107 and saved at stage 108, and the numerical vectors Vdb, previously stored in the data storage for each image from this data storage. Then (step 110) images similarity as dV=min (Ven−Vdbj) is computed, j from 1 to i, where i—the number of images stored in data storage (database), Ven—numeric vector of the image specified by the user at stage 101, Vdb—a numeric vector of processed and stored image in a data storage.

$$Ven-Vdb=|Ven1-Vdb1|+|Ven2-Vdb2|+\ldots+|Venk-Vdbk|,$$ where k—a number of geometric shapes (segments) on an image.

Further, (step 111) the similarity of the input image is determined, and images are considered similar if the difference dV less than introduced at stage 103 the threshold value "boundary value", defined by user in module for input configuration, to setup database and input image as the limit of similarity for this database. If the difference dV greater than introduced at stage 103 the threshold value "boundary value", defined by user in module for input configuration, to setup database and input image as the limit of similarity for this database, the image does not consider as similar (step 113).

With detected similar image the user can do (step 112) necessary actions, depending on the purpose for which such images were determined. For example, if the method is used as part of a program for organizing images—the user can select a higher quality image and delete the others. If the method is used as part of a duplicates warning system—the user will see that similar image exists, and if the degree of similarity from his point of view is sufficient, then remove his image. If the method is used to provide information about the actual location of the gallery, which exhibited drawings, a similar one was found, the user will be given information about the gallery (name, address, etc).

The same procedure is used for images fragments.

EXAMPLE 2

Figure 15:
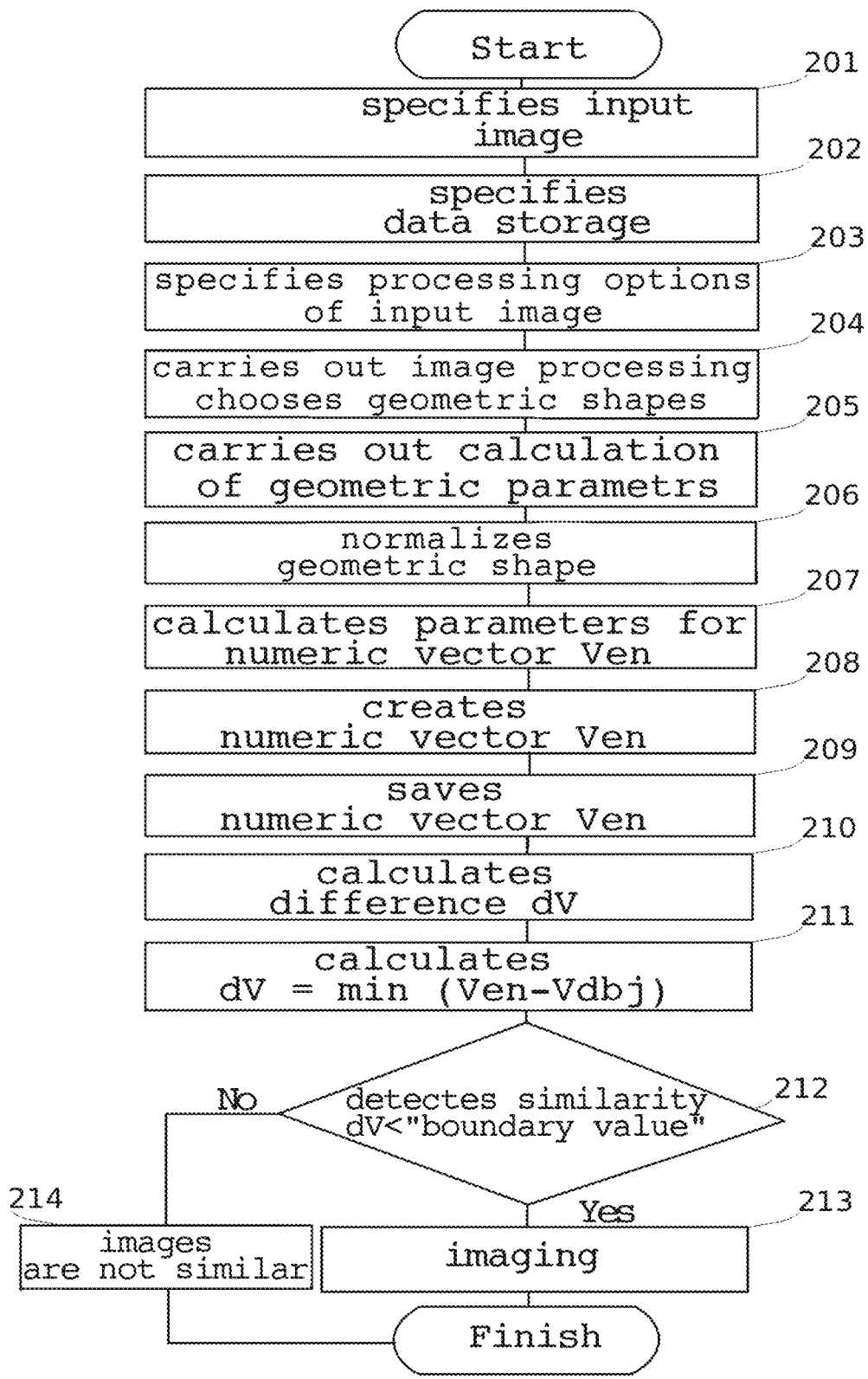
FIG. 15 shows a flowchart of the proposed method.

As Shown in FIG. 15

The user indicates (step 201) an input image concerning which to determine whether there is already similar image in a data storage.

The user indicates (step 202) data storage (database), where is stored an input image, and is used to compare to the processed images.

The user specifies the processing parameters, segmentation options and limit value "boundary value" (step 203).

Stages 201-203 are carried out using the module for maintenance, configuration and database input image.

Module with means for image segmentation where carried out image processing (step 204) and separated geometric shapes. Then (step 205) geometric parameters computing of the separated geometric shapes is carried out. Thereafter each geometric shape normalized (step 206) (i.e. geometric shape transformed ("inscribed" in a rectangle, circle or other shape with predefined parameters (side length or radius length), and all other geometric parameters of shape remains unchanged during this transformation). Thereafter, geometric shapes are processed and computed (step 207) parameters for numeric vector Ven, such as area ratio to the outline length Sn/Ln, and, if necessary, area Sn, outline length Ln, shortest projection Psn and longest projection Pln on the X and Y axis, and a number of outline angles An of the geometric shape.

Module with means for the development of numerical vector build (step 208) a numeric vector for all selected geometric shapes (image segments). The vector includes sufficient parameters for input image comparing with images in a given data storage. The numeric vector expressed as follows:

$$Ven=[Sn1/LnSn1\ Ln1\ Psn1\ Pln1\ Sn2/LnSn2\ Ln2\ Psn2\\ Pln2\ Sn3/Ln3\ Sn3n3\ Psn3Pln3\ \ldots\ Snk/L\ Snk\ Lnk\ Psnk\\ Plnk],$$ where k—a number of geometrical shapes (segments)

allocated on the image and the value Sn/Ln, Sn, Psn and Pln for each geometric shape (segment) can be added to improve the accuracy of comparison.

Module with means for numeric vector storage retain (step 209) a numeric vector Ven as an array of numeric values in this module. Then (step 210) difference dV is computed between the numerical vector Ven, built at stage 208 and saved at stage 209, and the numerical vectors Vdb, previously stored in the data storage for each image from this data storage. Then (step 211) images similarity as dV=min (Ven−Vdbj) is computed, j from 1 to i, where i—the number of images stored in data storage (database), Ven—numeric vector of the image specified by the user at stage 201, Vdb—a numeric vector of processed and stored image in a data storage.

Ven−Vdb=|Ven1−Vdb1|+|Ven2−Vdb2|+ . . . +|Venk−Vdbk|, where k—a number of normalized geometric shapes (segments) on an image.

Further, (step 212) the similarity of the input image is determined, and images are considered similar if the difference dV less than introduced at stage 203 the threshold value "boundary value", defined by user in module for input configuration, to setup database and input image as the limit of similarity for this database. If the difference dV greater than introduced at stage 203 the threshold value "boundary value", defined by user in module for input configuration, to setup database and input image as the limit of similarity for this database, the image does not consider as similar (step 214).

With detected similar image the user can do (step 213) necessary actions, depending on the purpose for which such images were determined.

The same procedure is used for images fragments.

EXAMPLE 3

The present example of the proposed method is given using standard Lena image (FIG. 9), the transformed Lena_mr180 image (FIG. 10), a standard Mandrill image (FIG. 11), Baboon image, which contains the same object without changes and on FIG. 11 is just their files having different names (FIG. 12), Pepper image, which turned and reduced to the original (FIG. 13).

Lena image (FIG. 9) and Lena_mr180 image (FIG. 10) contain the same object, but images were specifically processed. Lena_mr180 image (FIG. 10) reflected and rotated by 180 degrees in comparison with the figure (FIG. 9).

Mandrill image (FIG. 11) and Baboon image (FIG. 12) contain the same object without changes, they just having different file name: mandrill.jpg and baboon.jpg.

Pepper image (FIG. 13) turned and reduced comparing to the original.

A standard method for segmentation basing on color and brightness change is chosen for segmentation.

The value of the area S is the number of points within the geometric shape/segment (for example, marked with white), the value of the outline length is the number of points that are nearest neighbors outside the geometric shape/segment.

So, the simplest numeric vectors consisting of area ratio to the outline length S/L for each geometric shape/segment will form:

for Lena.jpg image (FIG. 9):
Ven=[1.04 2.30 1.89 1.29 1.43 1.57 1.62 1.62 1.76 1.45 1.55 1.89 2.20 0 0 0];

for Lenna_mr180.jpg image (FIG. 10):
Ven=[1.04 2.31 1.74 1.30 1.42 1.60 1.64 1.62 1.78 1.41 1.60 1.97 2.13 0 0 0];

for mandrill.jpg image (FIG. 11):
Ven=[1.01 1.69 1.46 1.34 1.67 2.09 1.53 1.58 1.74 2.03 3.07 0 0 0 0 0];

for baboon.jpg image (FIG. 12):
Ven=[1.01 1.69 1.46 1.34 1.67 2.09 1.53 1.58 1.74 2.03 3.07 0 0 0 0 0];

for pepers-flip-small image (FIG. 13):
Ven=[1.66 1.52 1.40 1.68 1.97 1.27 1.23 1.20 1.51 1.40 1.94 1.74 1.80 0 0 0].

With configured limits similarity dV=3.0, we obtain the following working method results:

| Comparable images | Vectors difference | Result |
| --- | --- | --- |
| Lena.jpg <-> lena_wr180.jpg | 0.49 | Less than dV; Similar. |
| Lena.jpg <-> mandrill.jpg | 8.20 | More than dV; Not similar. |
| Lena.jpg<-> baboon.jpg | 8.20 | More than dV; Not similar. |
| Lena.jpg <-> pepper_flip_small.jpg | 5.17 | More than dV; Not similar. |
| Lena_wr180.jpg <-> mandrill.jpg | 8.08 | More than dV; Not similar. |
| Lena_wr180.jpg<-> baboon.jpg | 8.08 | More than dV; Not similar. |
| Lena_wr180.jpg <-> pepper_flip_small.jpg | 5.01 | More than dV; Not similar. |
| Mandrill.jpg<-> baboon.jpg | 0 | Less than dV; Similar. |
| Mandrill.jpg <-> pepper_flip_small, jpg | 8.26 | More than dV; Not similar. |
| Baboon.jpg <-> pepper_flip_small.jpg | 8.26 | More than dV; Not similar. |

Benefits of the Proposed Method:

A universality of the method—defined meaningful indicators, which are compared in the future, there is no direct comparison of two images.

A disposable computing—a numeric vector can be saved and reused.

An insensitivity to affine transformations of the image (zoom, rotate, reflection).

An insensitivity to affine transformations of image's parts (till some extent).

A low sensitivity to minor differences in image (addition or withdrawal of small objects within the image does not prevent to compare them).

A hierarchy of values and reduce of data to be stored for images comparison—the greater an image, the less value types required for comparison. All parameters required only to compare specific geometric shapes.

The proposed method can be used in the development of management systems for large databases/image banks to determine similar images and subsequent removal of excess files; image filtering systems on the sites, to avoid duplicate graphic content publishing; systems for content search on sites and portals for the image-based search (such as searching for information on art gallery, which exhibits images, image by image, where it is exposed); and other automated imaging to determine or to filter them in real time.

The invention claimed is:

1. Automatic method for similar images and image fragments detection based on image content, characterized in that through a computer system, which control unit contains additional interconnected modules:
   module for input configuration, to setup data storage and input image;
   module for image segmentation;

module for segments processing;
module for numeric vector development;
module for numeric vector storage;
user module for data representation, are carried out the following stages:
a) specifying at least one input image;
b) specifying options of the input image processing;
c) carrying out the input image processing, according to the options, selected at stage b);
d) choosing through the segmentation, at least one geometric shape;
e) normalizing indicated geometric shapes and computing area ratio to the length of the outline Sn/Ln of the normalized geometric shape for creation of the numerical vector Ven, and additionally geometric parameters: area Sn, outline length Ln, shortest projection Psn and longest projection Pln on the X and Y axis, and a number of outline angles An of the geometric shape;
f) creating numeric vector Ven, which includes geometric parameters calculated at stage e), for each geometric shape selected at stage d), wherein the numeric vector Ven expressed by the following formula:

$$Ven=[Sn1/Ln\ Sn2/Ln\ Sn3/Ln\ 3\ \ldots\ Snk/Lnk],$$

where k—a number of geometrical shapes (segments) allocated on the image;

g) saving numeric vector built at stage f) in data storage and in module for numeric vector storage of the control unit;

h) calculating the difference dV between the numerical vector Ven, built at stage f), and image numerical vector Vdb previously saved in a data storage for all comparative images;

i) identifying images as similar images, if the dV difference less than the specified boundary value.

2. Automatic method of claim 1, wherein additional geometric parameters, which calculated at stage e), are: area ratio to the length of the outline S/L of the geometric shape, shortest projection Ps and longest projection Pl of the geometric shape, and a number of outline angles A of the geometric shape.

* * * * *